Dec. 3, 1963   W. J. HOWARD   3,112,770
VALVE STEM CAPS
Filed Nov. 8, 1960
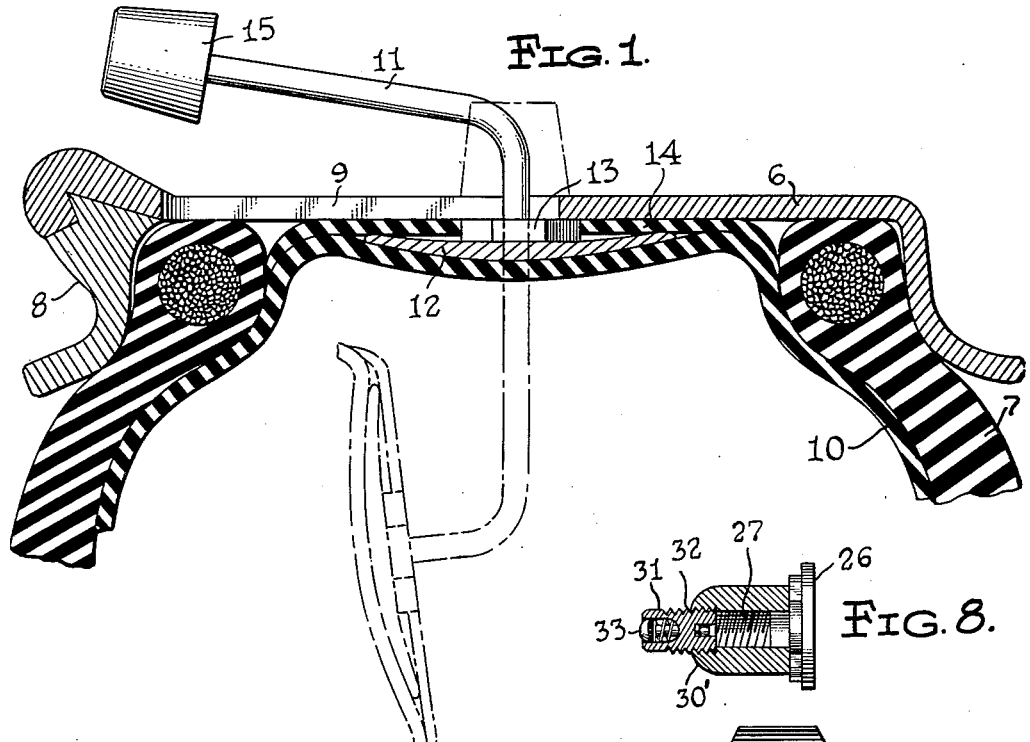
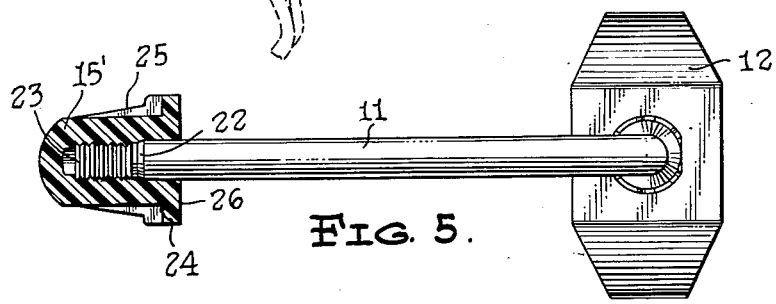
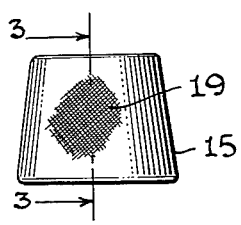 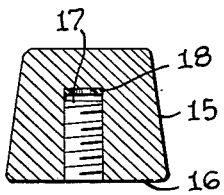 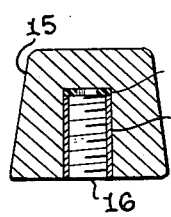 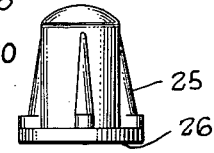
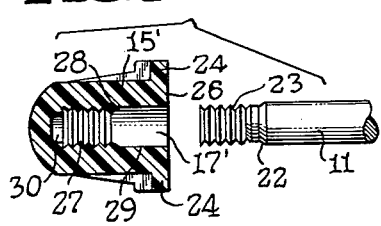
INVENTOR
*William J. Howard*
BY *Aubrey D. McFadyen*
ATTORNEY United States Patent Office 3,112,770
Patented Dec. 3, 1963

3,112,770
VALVE STEM CAPS
William J. Howard, P.O. Box 573, Wilson, N.C.
Filed Nov. 8, 1960, Ser. No. 67,985
4 Claims. (Cl. 138—89.2)

This invention relates to caps for the valve stems of the inner tubes of pneumatic vehicle tires, and the present application is a continuation-in-part of my pending application Serial Number 847,152, filed October 19, 1959, now abandoned. More particularly, this invention comprises a cap adapted to seal and protect the end of the valve stem, and which, at the same time, is designed to prevent withdrawal of the stem into the tire in the event of a puncture. While the invention is primarily devised for use in connection with tires of heavy trucks and buses, the invention may be used advantageously wherever it is desirable to cover the end of a valve stem and/or prevent withdrawal of the stem through the aperture in the rim and into the tire casing.

In inner tubes of truck tires as constructed at the present time the stem in which the valve is encased is comprised of a metal tube on the order of five inches in length, which tube or stem is led out through a slot provided in the rim for ready access for purpose of inflating the tire. For ease of insertion through said opening and for inflating the tube, this stem is commonly bent to extend inwardly of the wheel toward the clincher rim. Now when a puncture occurs while the vehicle is in motion, or, in the case of dual tired wheels, if the vehicle be driven with one of the tires of such wheel in a deflated state, the flexing of the deflated tire causes the stem to be drawn through the opening in the rim and into the casing. The result is that the metal end of the stem may be shifted about inside the tire casing at a speed great enough and with force enough to seriously damage the cords or fibres of the casing. Truck drivers known from experience that a withdrawn or "swallowed" stem commonly scrapes and gouges the inner wall of the casing, cutting the cords of the tire, the heat built up within the tire often melting the tube and welding cut cords and tube together, both tube and casing becoming a total loss. By preventing withdrawal of the tube stem into the tire, damage to the casing of the kind just mentioned ordinarily can be prevented. Since truck tires cost in excess of $100.00 each, the economic aspects of the present invention are manifest.

In early types of all-metal valve stems, the stem was exteriorly threaded from tip to base and a thin ring nut was screwed along the stem into contact with the rim for retaining the stem in place. At present, the inner tubes of smaller tires have short rubber stems, in the end of which is mounted a metal valve casing; but the rubber type stem presents the same problem of damaging the tire when withdrawn thereinto. Tubes of heavy truck tires, however, still employ all-metal stems, of the length above referred to. By reason of their length, frequently accompanied by an intermediate bend to bring the tip of the stem close to the rim, it is not feasible to thread the entire stem and employ a ring nut as a retainer, as was formely done. In the present metal stems only the tip is threaded, and that for receiving a valve cap.

It has been proposed to anchor the short rubber stems of present types of smaller tubes by spring clamps to be snapped onto the projecting end of the stem; and along the same line, the notion has been proposed in the art to permanently substitute an enlarged extension for the conventional cap, the extension having a skirt continuously reacting against the rim and also having passageway therethrough terminating in a threaded nipple to which the conventional cap is transferred. As for heavy truck tires having all-metal stems, drivers have resorted to bending the valve stem against the back of the rim and bolting a clamp plate upon it. While the last-mentioned expedient will anchor a valve stem, it is objectionable in that tools are necessary for applying and removing the clamp plate, and, also, the weight of the device upsets the balance of the wheel. Further, in the case of dual tired wheels, said clamp plate can be applied to the inner wheel only after removal of the outer tire.

With the foregoing in mind, it is the principal object of the present invention to provide a detachable valve cap devised for the dual purpose of capping the valve stem and preventing withdrawal or swallowing of the stem into the tire under the circumstances enumerated above.

A further object of this invention is to provide a simple, inexpensive means for the purpose aforementioned, and which can be securely applied to and removed from a valve stem without resorting to tools.

Yet another object of this invention is to provide a structure of the nature above mentioned which is highly practical, and can be marketed at a price acceptable to the trade.

A still further object of this invention is to provide a cap which cannot be drawn through the rim slot and which cap incorporates a valved casing through which the tire can be inflated without removal of the cap.

The foregoing and other objects and advantages of this invention will be best understood from a consideration of the following detailed description, taken in connection with the accompanying drawings forming a part of this specification, with the understanding, however, that the invention is not confined to any strict conformity with the showing of the drawings and may be changed and modified so long as such changes or modifications mark no material departure from the salient features of the invention as expressed in the appended claims.

In the drawings:

FIGURE 1 is a transverse section of a portion of a tire mounted on a truck rim, showing in solid lines the usual disposition of the valve stem, with the cap of one form of the present invention applied to the tip end of the valve stem, a position the stem and cap tend to assume when the tire is deflated being shown in dotted lines;

FIGURE 2 is a view in elevation of one form of cap embodying the present invention;

FIGURE 3 is a sectional view taken on line 3—3 of FIGURE 2;

FIGURE 4 is a sectional view of a modified form of the invention;

FIGURE 5 is a view of the valve stem of FIGURE 1 with a further modified form of the cap of my invention shown in longitudinal cross section as mounted thereon;

FIGURE 6 is a detail view of the cap of FIGURE 5, shown in longitudinal cross-section and removed from the end of the valve stem;

FIGURE 7 is a view in elevation of the cap shown in FIGURES 5 and 6;

FIGURE 8 is a view, partly in longitudinal section, of the form of cap shown in FIGURE 5-7, modified by incoporating therein a metal valve casing for use in inflating and/or venting the tire without bothering to remove the cap.

Referring now more particularly to the drawings, wherein similar reference numerals designate similar parts throughout the several views, and for the moment referring specifically to FIGURE 1, reference character 6 designates the rim of a truck tire, and 7 a tire casing mounted thereon. Rim 6 includes a removable clincher section 8 along its inner edge, and is also provided with an opening in the form of a valve stem receiving slot 9 extending from substantially the center of the rim to said clincher section. Slot 9 is commonly on the order of five-eighths of an inch wide, and conventional stem caps offer little or no resistance to being drawn therethrough. It will be understood that lugs or other connecting means are provided at spaced points along the outer portion of rim 6 for connection thereof to its wheel. Within casing 7, is a conventional heavy duty inner tube 10 having a conventional metal valve stem 11 projecting through slot 9. The outer end of stem 11 is formed with cap receiving threads. These threads normally extend for about one-half inch inwardly from the tip of the stem, and include approximately ten turns. The valve stem is connected to metal plate 12 of the inner tube by means of nut 13; and a heavy rubber flap 14 is shown surrounding the base of the valve stem and covering the underside of slot 9, as is well known in the art. The portion of stem 11 projecting through the rim is shown extending inwardly toward the clincher section, as is common practice. For inflating the tire, the hose nozzle is hooked over the end of the stem and pulled outwardly to obtain a good connection. The cap of one form of my invention is designated generally by reference numeral 15. The purpose of the cap, as indicated above, is to serve the usual function of a valve cap, and it is of a material and design, as will appear hereinafter, to serve also as an anchor in preventing accidental withdrawal or swallowing of the stem into the casing 7.

Cap 15 is comprised of a one-piece, solid body, illustrated in FIGURES 1–4 as of generally circular cross-section. The center portion of the lower end wall 16 of the body is formed with a threaded cylindrical socket 17 adapted to receive the threaded end of the stem 11 therein. Preferably, socket 17 should be of a depth on the order of a half inch to secure a strong connection throughout the threaded portion of stem 11. The use of the usual rubber seal 18 shown seated in the bottom of the socket, is optional.

Cap 15 may be of either metal or plastic. When of metal, a light weight material, such as aluminum, is preferable, as its weight is less apt to upset the balance of the wheel to which the cap is applied; and on the other hand, a metal cap of the design of this invention possesses the requisite strength to hold any stem against being pulled into the tire. When the cap is formed of plastic, a wide selection of materials is available; but nylon or a Lucite resin are recommended. Nylon, however, has been found especially suited to the requirements of the present cap, since it offers considerable strength, toughness and durability, is moldable, will hold fast to the threaded end of a valve stem, makes an excellent air seal therewith, and will not crack under the stresses and temperatures it is likely to be subjected to.

The exterior configuration of the cap of the forms of the invention of FIGURES 1 to 4 is not critical and may be varied as desired, but it is important that the outer surface of the cap be roughened, as at 19, as by knurling or forming it with grooves or ribs extending lengthwise thereof, to assure a good finger grip in screwing the cap tightly onto the stem. It is contemplated that the exterior surface of the cap should be of a conspicuous color, such as yellow, to facilitate inspection for the presence of all caps on the vehicle. For the same reason it is also contemplated that said surface may be treated with fluorescent material to render the caps readily visible at night.

It is especially important that the diameter of the lower wall 16 of the caps of this invention be sufficient to overlappingly bridge the slot 9 of the rim, so that the downward pull of the stem will be resisted substantially evenly on both sides of the slot, without admitting the lower edge of the cap to enter into slot 9 and thus cause canting and bending of the stem. As a working rule, therefore, for the width of slot 9 mentioned above end wall 16 of the cap should be of a diameter on the order of one inch. Earth moving apparatus and tractors employ a jumbo valve stem and this rim slot therefore is somewhat wider than that found in trucks. Caps for this type apparatus should be on the order of one and a quarter inch in diameter, and substantially of the same height. The cap should be of sufficient length to provide a socket having a minimum depth of one-half inch and offering the strength to anchor the cap against passing through slot 9; otherwise the length of the cap is not critical. For symmetry, and also to meet the qualities enumerated, the length of the cap should be of about the same dimension as its diameter.

The cap shown in FIGURES 2 and 3 may be formed by forging, die casting, or machining. In the case of machining, the stock may be procured in the form of rods of the diameter of wall 16, preferably with the surface provisionally roughened as indicated above. These rods can be severed in any conventional way into unit lengths corresponding to that of the cap, whereupon the units can be drilled and tapped as shown. In die casting, the cap of FIGURES 2 and 3 can be produced virtually complete in the single operation of casting; and if a suitable color plastic be employed, a separate coloring of the exterior of the cap will be unnecessary.

In order to avail of the ease of production offered by plastic material and at the same time effect a metal-to-metal connection to stem 11, it is feasible to cast the plastic body about and thus bond it to an interiorly threaded metal tube section 20, as shown in the modification of FIGURE 4. Section 20 is of the size and length indicated above to make a secure engagement with stem 11.

The form of caps shown in FIGURES 5 to 8 comprises presently preferred and highly successful commercial embodiments of my invention. In FIGURE 5, a standard stem 11 of a truck tire is shown at approximately full scale. As shown in more detail in FIGURE 6, the outer end of stem 11 includes a tapered portion 22 adjoining the somewhat reduced threaded end portion 23. The threaded portion 23 is on the order of one-half inch in length and normally bears about 10 threads.

Cap 15' of this form of the invention is likewise a one-piece construction and exteriorly includes about its base a peripheral flange 24 of the diameter to bridge slot 9 in the manner previously pointed out. Tapered ribs 25, integral with said flange and the outer wall of the cap, are disposed circumferentially of the cap. These ribs brace and strengthen flange 24 and at the same time afford a finger grip for tightly screwing the cap in place, as well as facilitating manufacture, as will hereinafter appear. The ribs thus render unnecessary the knurling 19 of the first forms of the invention, and at the same time effect a considerable saving in material over the cylindrical structures of FIGURES 2 to 4, without sacrificing strength.

The center portion of the flat end wall 26 of the cap is formed with a cylindrical socket 17' adapted to receive the end 23 of the stem therein. Said socket includes an innermost threaded portion 27 corresponding to the threads 23 of the stem, an intermediate tapered portion 28 for air sealing engagement with the tapered portion 22 of the stem; and an outer collar portion 29 for extending along the body of stem 11 adjoining tapered portion 22 for a distance of three-eighths to one-half an inch, in snugly fitting relationship therewith, for reasons to appear hereinafter. The interior of the socket is precisely shaped to conform exactly with the free end of stem 11, and this assures a triple air seal for the stem. The primary seal is the abutment of the end of the stem 23 against the bottom of socket 17'. The secondary seal occurs between the tapered portion 22 of the stem and the tapered portion 28 of the cap, and the tertiary seal is between the threads of the cap and stem. Each of these seals, when properly engaged is sufficient. The combination of the three effect a perfect seal under every exigency. Because the tapered portions 22 of some makes of stems are not absolutely uniform, however, it may be desirable that the depth of threaded portion 27 be formed about .003 inch greater than the length of threaded portion 23 of the stem to assure that the tapered portions 22, 28 of the socket and stem will be brought into sealing contact before the end of the stem abuts the bottom of socket portion 27. Centrally of the bottom of socket 17' I provide a small recess 30 in which the end of the valve pin may project.

The collar portion 29 of the cap and its fit onto the body of stem 11, as above described has several advantages. First, in the bumping of truck wheels, stem 11 frequently flexes downwardly and tends to strike against the inner surface of rim 6. This beats up the conventional cap, and in the process the outer end of the stem is often bent to a degree sufficient to ruin the valve unit, as well as preclude insertion of a new valve unit. Also, the striking of valve stems against the rim has been known to chafe holes through the stem end, thereby ruining the stem, and consequently rendering the tube useless. The provision of the collar portion 29 extending along stem 11 and the position of flange 24 of the present cap on the valve stem is such that flange 24 receives the blow and protects against bending of the valve containing area of the valve stem and beating up of the stem threads, as well as contributing substantially to the air seal of the cap.

In practice, I fashion the cap of FIGURES 5 to 7 from plastic material, nylon having proved preferable in actual commercial production and use in several hundred thousands of these caps. In making the cap of nylon, a mold is provided in which projects a rotatable dummy duplicate of an actual valve stem 11. After pressure injection of the nylon in fluent form, and setting thereof, the dummy stem is unscrewed, and the mold withdrawn, thereupon the cap may be removed. The ribs 25 prevent rotation of the cap during unthreading of the dummy stem therefrom. The nylon stock may be colored as desired for the finished cap, and the cap may be rendered fluorescent, if so desired.

In the modification of FIGURE 8 the cap body, here shown in longitudinal section for the major portion of its length, is identical in every respect with the cap of FIGURES 5–7 save that a conventional Schrader type valve casing 31 extends through the outer end 30' thereof. One end 32 of the valve casing is incorporated in the end 30' of the cap during the molding thereof. A valve element 33 in casing 31 is biased outwardly by the usual coil spring to closed position, and the inner end of casing communicates with the interior 27 of the cap. It should be understood that the connection of the valve casing 31 to the cap is solid and leak proof, while the cap body establishes a leak proof connection with stem 11, as described for the form of the invention shown in FIGURES 5–7. It is contemplated that valve 31 supplant the regular tire valve normally found in stem 11. However, it is feasible to apply the cap of FIGURE 8 without removing the standard valve from stem 11.

It is apparent that the cap of FIGURE 8 serves the same purpose of preventing withdrawal of the stem into the casing as described for the previously described forms of the invention; and manifestly it is unnecessary to remove the cap of FIGURE 8 in order to inflate the tire to which it is applied. A conventional cover may be applied to valve casing 31 if desired.

When applied to the end of a valve stem the caps of this invention serve as a cover and/or seal in the manner of the conventional cap, and in addition prevent the stem from being pulled into casing 7. With particular reference to the cap of FIGURES 5–7, it has been found that the air seal is well-nigh perfect. On numerous prolonged tests no perceptible leakage about the cap has been detected. While the tight fit of the threads of the cap and stem presents in a good seal, the final insurance is the fit of the tapered portion 28 of the cap onto tapered portion 22 of the stem and the abutment of the end of the stem against the bottom of socket 17'. The tighter the cap is screwed home, the more snug the fit of the tapered parts. The .003 inch tolerance offered by the threaded portion of the cap, alluded to above, assures sealing contact of the tapered portions after repeated removal.

Upon deflation of the tire under the circumstances mentioned above, withdrawal of the stem into the tire is prevented by engagement of the end wall 16 of the cap of FIGURES 2–4, and wall 26 of the cap of FIGURES 5–8 against the back side of the rim, overlappingly bridging slot 9, as shown in dotted lines in FIGURE 1. The stem retaining function described herein is impossible with conventional valve caps. In the first place, the diameter of the conventional cap is usually much less than the width of slot 9, and, at most, seldom as large as the width of said slot. As a result, conventional caps readily pass through slot 9 and the stem enters the tire. In the second place, even were the conventional cap of a diameter to bridge slot 9, it is of such soft material that it would be quickly chewed up and give way. Finally, the threaded zone of conventional caps is normally only a matter of 3 to 5 turns; that is to say, a quarter of an inch maximum, and this represents too little engagement with the valve stem to stand the strain incident to ground rotation of a deflated tire. Therefore the threads of the cap would quickly strip and the cap lose its grip on the stem.

The foregoing description had been given in detail without thought of limitation, since the inventive teachings are capable of assuming other physical embodiments without departing from the spirit of the invention and scope of the appended claims.

What is claimed is:

1. A cap for use on the threaded end of the all-metal valve stem of a motor truck tire wherein the stem is cylindrical and connected at one end directly to the inner tube of the tire and extends through a transverse slot in the tire rim having a width of at least one-half inch and said stem terminates in an end portion having threads formed therealong for a distance on the order of one-half inch, said cap consisting of a one-piece, elongated circular body portion of sturdy, tough plastic having a planar end wall of a diameter substantially double the width of said slot, said wall including a peripheral radially extending flange, spaced, circumferentially disposed brace ribs integral with said body portion and said flange, said end wall having formed centrally therein a cylindrical socket including a threaded portion of a bore and depth corresponding substantially to said threaded portion of said stem for receiving said stem portion therein.

2. The structure as set forth in claim 1, wherein said cylindrical socket includes an unthreaded cylindrical collar portion extending outwardly from said bottom threaded portion, said unthreaded portion being of a length substantially equal to that of said threaded portion and of a bore for snugly fitting about the body portion of said stem adjacent the threaded end thereof.

3. A cap for use on metal valve stems wherein said stem projects through an opening in the tire rim on the order of at least one-half inch thereacross and said stem terminates in a reduced end portion on the order of one-half inch in length, said reduced portion being threaded throughout its length and said reduced portion being joined to the body portion of said stem by a tapered portion, said cap consisting a a circular body of sturdy, tough plastic having one flat end, said body being formed about said flat end with a radially extending peripheral flange, circumferentially spaced, tapered ribs integral with said flange and body and gradually tapering toward the opposite end of said body, the flat end of said body being formed centrally thereof with a socket, said socket including a bottom threaded portion of a depth and bore for receiving the entire threaded end portion of said stem, an outer unthreaded collar portion of a length substantially equal to that of said threaded portion and of a bore for snugly fitting about the body of said stem adjacent the threaded end thereof, and an intermediate tapered portion for sealingly fitting the tapered portion of said stem, the flat end of said body being of a dimension to overlappingly bridge said opening in said rim.

4. The structure as set forth in claim 3, wherein one end of an elongate valve casing is mounted in the end of said cap opposite said planar wall in alignment and communication with said socket, the other end of said valve projecting beyond said cap and presenting a valve element.

References Cited in the file of this patent

UNITED STATES PATENTS

| | | |
|---|---|---|
| 1,356,476 | Schweinert | Oct. 19, 1920 |
| 2,248,450 | Eger et al. | July 8, 1941 |
| 2,475,451 | Gouirand | July 5, 1949 |
| 2,780,243 | Williams et al. | Feb. 5, 1957 |
| 2,812,000 | Trinca | Nov. 5, 1957 |
| 2,937,685 | Stephens | May 24, 1960 |

FOREIGN PATENTS

| | | |
|---|---|---|
| 470,310 | Canada | Dec. 26, 1950 |